US009049745B2

(12) United States Patent
Mujtaba et al.

(10) Patent No.: US 9,049,745 B2
(45) Date of Patent: Jun. 2, 2015

(54) WIRELESS ELECTRONIC DEVICES WITH DUAL CIRCUIT ARCHITECTURE

(75) Inventors: Syed A. Mujtaba, Santa Clara, CA (US); Jianxiong Shi, Pleasanton, CA (US); Isabel G. Mahe, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 13/347,641

(22) Filed: Jan. 10, 2012

(65) Prior Publication Data

US 2012/0182938 A1 Jul. 19, 2012

Related U.S. Application Data

(60) Provisional application No. 61/433,162, filed on Jan. 14, 2011.

(51) Int. Cl.
*H04W 88/06* (2009.01)
*H04W 36/14* (2009.01)
*H04W 8/18* (2009.01)

(52) U.S. Cl.
CPC ............... *H04W 88/06* (2013.01); *H04W 8/18* (2013.01); *H04W 36/14* (2013.01)

(58) Field of Classification Search
CPC ............ H04L 29/06802; H04L 63/0853; H04L 29/06027; H04L 29/06333; H04W 88/06; H04W 48/18; H04W 72/1215; H04W 76/028; H04W 36/14; H04W 8/18; H04B 1/3816
USPC ............ 370/328–331, 352, 359, 360; 455/435.1, 436, 443, 552.1, 553.1, 455/557, 558
See application file for complete search history.

(56) References Cited

U.S. PATENT DOCUMENTS

2003/0125073 A1*  7/2003  Tsai et al. .............. 455/552

(Continued)

FOREIGN PATENT DOCUMENTS

GB           2481702         4/2012

OTHER PUBLICATIONS

"UICC," Wikipedia, (4 pages) [Retrieved on Dec. 15, 2011]. Retrieved from the Internet: <URL: http://en.wikipedia.org/wiki/UICC>.
"Subscriber Identity Module," Wikipedia, (16 pages) [Retrieved on Dec. 15, 2011]. Retrieved from the Internet: <URL: http://en.wikipedia.org/wiki/subscriber_identity_module>.
"Authentication & Encryption," GSM for Dummies (10 pages) [Retrieved on Dec. 15, 2011]. Retrieved from the Internet: <URL: http://gsmfordummies.com/encryption/encryption.shtml>.

(Continued)

*Primary Examiner* — Xavier S. Wong
(74) *Attorney, Agent, or Firm* — Treyz Law Group; Jason Tsai; Joseph F. Guihan

(57) ABSTRACT

Electronic devices may have multiple wireless integrated circuits such as first and second baseband processor integrated circuits. The first baseband processors may be used exclusively for handling packet switched traffic, whereas the second baseband processor may be used exclusively for handling circuit switched traffic. Radio-frequency front end circuitry may be used to couple multiple antennas to the baseband processors and associated radio-frequency transceivers. The first baseband processor may be coupled to a first universal integrated circuit card (UICC) storing a first subscriber profile, whereas the second baseband processor may be coupled to a second UICC storing a second subscriber profile. The first baseband processor may be used to support any desired circuit switched radio access technology, whereas the second baseband processor may be used to support any desired packet switched radio access technology.

6 Claims, 7 Drawing Sheets

(56) References Cited

U.S. PATENT DOCUMENTS

| | | | |
|---|---|---|---|
| 2004/0259585 A1 | 12/2004 | Yitzchak et al. | |
| 2005/0130654 A1* | 6/2005 | Di Claudio et al. | 455/433 |
| 2006/0130099 A1 | 6/2006 | Rooyen | |
| 2010/0067507 A1* | 3/2010 | Park | 370/338 |
| 2010/0227591 A1 | 9/2010 | Park et al. | |

OTHER PUBLICATIONS

"Network Architecture," GSM for Dummies (17 pages) [Retrieved on Dec. 14, 2011]. Retrieved from the Internet: <URL: http://gsmfordummies.com/architecture/arch.shtml>.

* cited by examiner

WIRELESS ELECTRONIC DEVICES WITH DUAL CIRCUIT ARCHITECTURE

This application claims the benefit of provisional patent application No. 61/433,162, filed Jan. 14, 2011, which is hereby incorporated by reference herein in its entirety.

BACKGROUND

This relates to electronic devices such as cellular telephones and, more particularly, to methods for handling packet switched and circuit switched traffic in an electronic device.

Electronic devices such as cellular telephones contain wireless circuitry such as radio-frequency transceiver integrated circuits and associated wireless baseband integrated circuits. These wireless baseband integrated circuits may be used in handling wireless voice and data communications.

Wireless traffic for an electronic device such as a cellular telephone typically includes circuit switched (CS) traffic and packet-switched (PS) traffic. Circuit switched traffic commonly includes voice calls, but can also include data. Packet-switched traffic commonly includes data, but can also include voice (e.g., voice over internet protocol phone calls).

Examples of circuit switched wireless protocols include 3G protocols such as Universal Mobile Telecommunications System (UMTS) and Code Division Multiple Access (CDMA) 1xRTT and 2G protocols such as Global System for Mobile Communications (GSM). Examples of packet switched wireless protocols include 4G protocols such as the Long Term Evolution (LTE), 3G protocols such as Evolution-Data Optimized (EV-DO) and High Speed Packet Access (HSPA), and 2G protocols such as Enhanced Data Rates for GSM Evolution (EDGE) and General Packet Radio Service (GPRS).

Modern wireless integrated circuits such as 4G wireless integrated circuits that support LTE protocols often offer legacy support for 3G/2G services. Using 4G wireless integrated circuits to support legacy services can, however, be inefficient, because the 4G wireless integrated circuits are not always as optimized as the 3G/2G chips when performing 3G/2G functions.

It would therefore be desirable to provide improved ways in which to support wireless communications in electronic devices.

SUMMARY

To take advantage of optimized 3G/2G wireless integrated circuits, a cellular telephone or other electronic device may be provided with dual wireless integrated circuits (e.g., dual baseband processor integrated circuits and corresponding radio-frequency transceiver circuits). A first of the baseband processor integrated circuits (e.g., a 4G chip that is optimized for handling packet switched traffic such as LTE data traffic) may handle exclusively packet switched traffic. A second of the baseband processor integrated circuits (e.g., a 3G/2G chip that is optimized for handling circuit switched traffic such as GSM voice traffic) can be used to handle exclusively circuit switched traffic.

In one suitable arrangement, the first baseband processor integrated circuit may be coupled to a first universal integrated circuit card (UICC) while the second baseband processor integrated circuit may be coupled to a second UICC. The first and second UICCs may be used to store separate subscriber identity module (SIM) data provided from the same wireless carrier or from different wireless carriers. In another suitable arrangement, the electronic device may only contain one UICC that is only coupled to one of the two baseband processor integrated circuits. In this example, one wireless carrier (i.e., the wireless carrier associated with the one UICC) is providing both voice and data service.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands using one or more antennas. The antennas can include loop antennas, inverted-F antennas, strip antennas, planar inverted-F antennas, slot antennas, patch antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
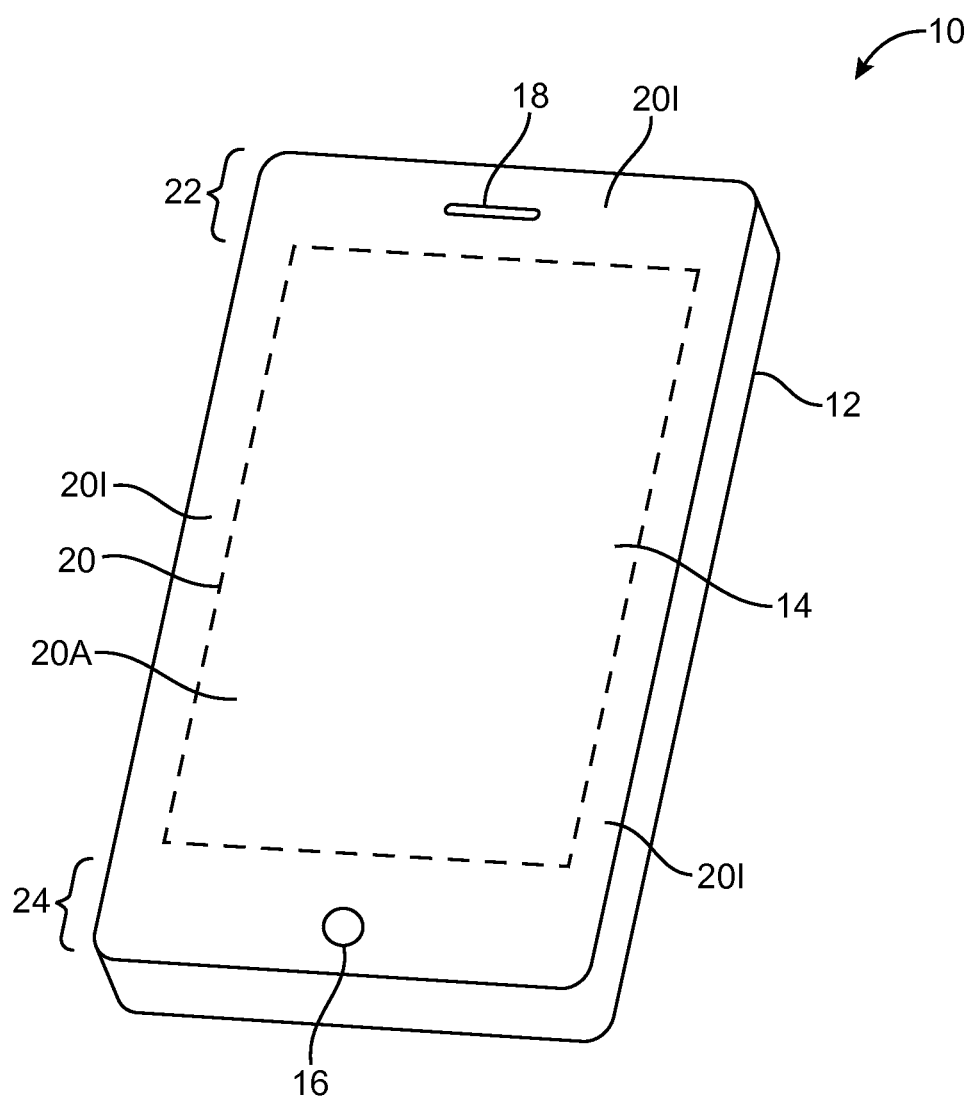
FIG. 1 is a perspective view of an illustrative electronic device with wireless communications circuitry in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a cellular telephone, a media player, a wrist-watch device, pendant device, headphone device, earpiece device, or other wearable or miniature device, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover either a first subset of bands or a second subset of bands and thereby cover all bands of interest.

Figure 2:
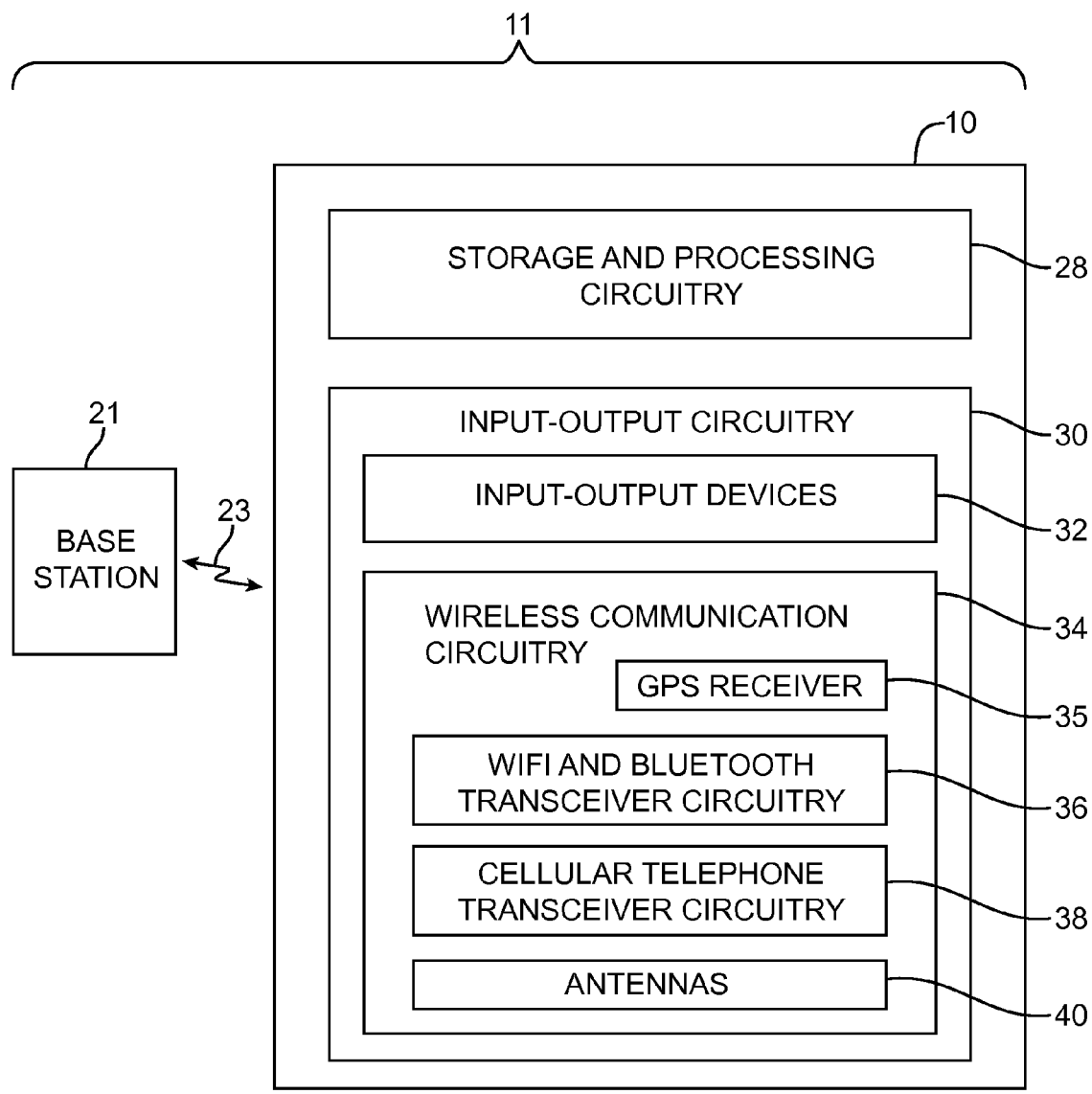
FIG. 2 is a schematic diagram of a wireless network including a base station and an illustrative electronic device with wireless communications circuitry in accordance with an embodiment of the present invention.

A schematic diagram of a system in which electronic device 10 may operate is shown in FIG. 2. As shown in FIG. 2, system 11 may include wireless network equipment such as base station 21 (sometimes referred to as a base transceiver station). Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, the "4G" Long Term Evolution (LTE) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received traffic channel signals, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

In some embodiments of the present invention, device 10 may be described that supports the circuit switching (CS) technology and packet switching (PS) technology. Circuit switching involves establishing a dedicated/exclusive communications channel through a network before any user data is transmitted. A channel established using circuit switching guarantees the full bandwidth of the channel and remains connected for the entire duration of the session (e.g., the channel remains unavailable to other users until the session is terminated and the channel is released).

Traditionally, the Public Switched Telephone Network (PTSN) is implemented using circuit switching. Device 10 may include a baseband processing circuit configured to support circuit switching technologies such as the 3G CDMA2000 1xRTT radio access technology, the 3G Universal Mobile Telecommunications System (UMTS) radio access technology, and the 2G GSM radio access technology (as examples). The baseband processing integrated circuit that is being operated to support circuit switching cellular telephone communications protocols may therefore sometimes be referred to as a "voice" baseband processor integrated circuit.

Packet switching involves organizing data to be transmitted into groups referred to as packets in accordance with the Internet Protocol (IP). Each packet may contain the IP address of the source node, the IP address of the destination node, user data (often referred to as data load or payload), and other control information. Unlike circuit switching, packet switching shares available network resources among multiple users. Each packet being sent may be routed independently to the desired destination, and as a result, each packet may experience varying packet transfer delays. Packets arriving at the destination node may be buffered until at least some of the transmitted packets have arrived. Once a sufficient number of packets have reached their destination, the packets can be reassembled to recover the original transmitted data at the source.

The Internet and most local area networks rely on packet switching. Device 10 may include a baseband processing circuit configured to support packet switching technologies such as the 3G Evolution-Data Optimized (sometimes referred to herein as "EV-DO") radio access technology, the 4G LTE radio access technology, the 3G High Speed Packet Access (HSPA) radio access technology, the 2G Enhanced Data Rates for GSM Evolution (EDGE) radio access technology, and the 2G General Packet Radio Service (GPRS) radio access technology (as examples). The baseband processing integrated circuit that is being operated to support packet switching radio access technologies may therefore sometimes be referred to as a "data" baseband processor integrated circuit.

Figure 3:
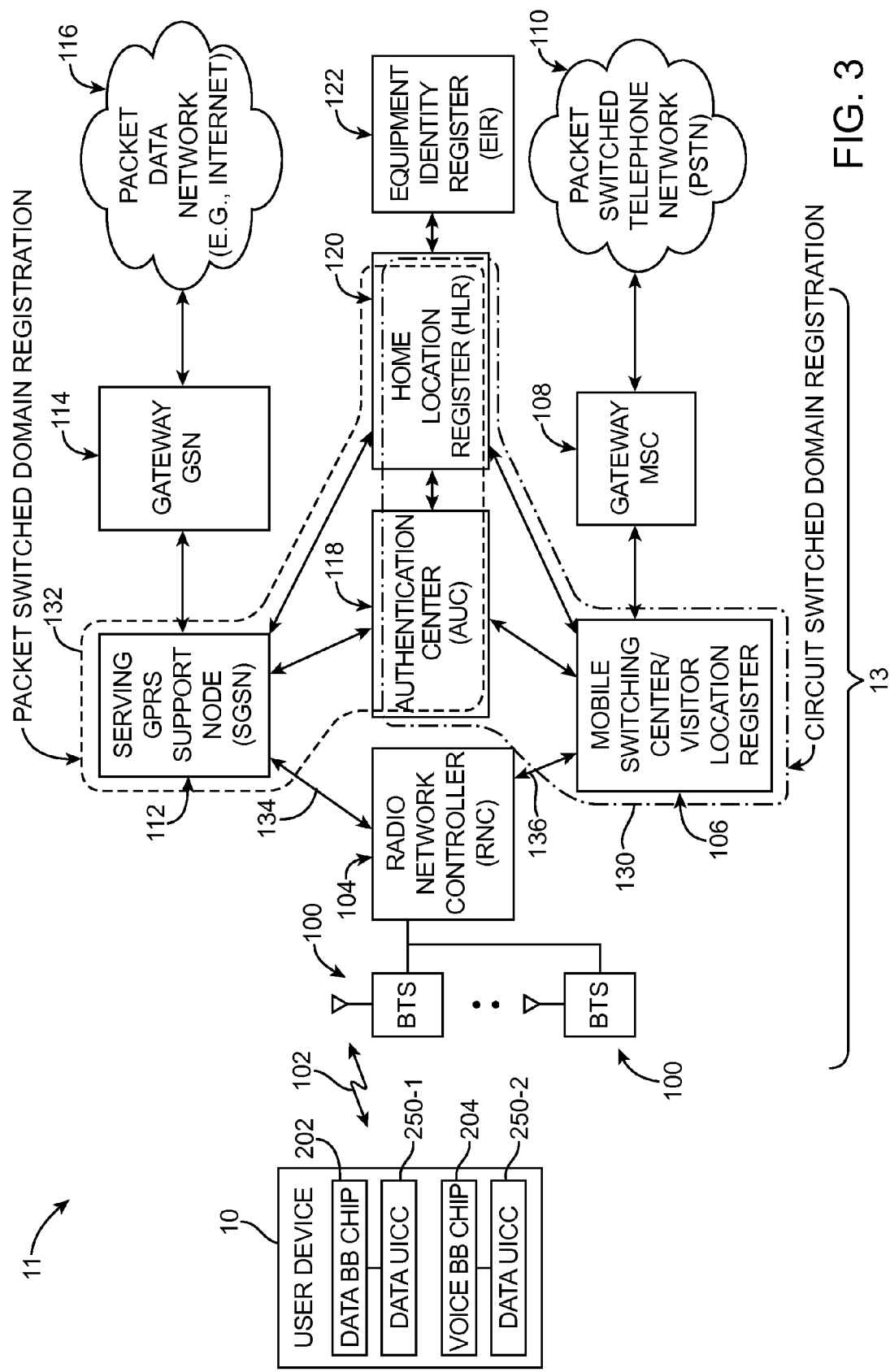
FIG. 3 is a diagram of an illustrative electronic device operable to communicate with both circuit switched (CS) and packet switched (PS) cellular networks in accordance with an embodiment of the present invention.

In one suitable arrangement of the present invention, device 10 may include a first baseband processing circuit 202 that is used exclusively (or primarily) for handling packet switched "data" traffic and a second baseband processing circuit 204 that is used exclusively (or primarily) for handling circuit switched "voice" traffic (see, e.g., FIG. 3). First and second baseband processing circuits 202 and 204 may be separate integrated circuits that are mounted on a printed circuit board secured within housing 12 of device 10. Using separate integrated circuits for data and voice, in general, provides greater performance and deployment flexibility. For example, voice baseband processor 204 may optimized for power consumption (thereby offering longer talk times), whereas data baseband processor 202 may be optimized to support the latest evolution in data speeds (e.g., baseband processor 202 may be used to support LTE regardless of the type of CS technology that is be supported by processor 204).

Baseband processor 202 may be selected to support at least one type of PS technology including (but not limited to) LTE, EV-DO, HSPA, EDGE, and GPRS, whereas baseband processor 204 may be selected to support at least one type of CS technology (including but not limited to) UMTS, CDMA 1xRTT, and GSM. As an example, baseband processor 202 may include memory and control circuitry for implementing the LTE protocol stack to handle LTE functions while baseband processor 204 may include memory and control circuitry for implementing the UMTS protocol stack to handle UMTS functions.

As another example, baseband processor 202 may include memory and control circuitry for implementing the LTE and EV-DO protocol stacks while baseband processor 204 may include memory and control circuitry for implementing the CDMA 1x protocol stack. As another example, baseband processor 202 may include memory and control circuitry for implementing the LTE and EDGE protocol stacks while baseband processor 204 may include memory and control circuitry for implementing the GSM protocol stack. These examples are merely illustrative. If desired, processors 202 and 204 and additional baseband processing circuits within device 10 may be configured to support any combination of radio access technologies.

A mobile network operator generally requires that wireless users be properly authenticated before wireless services are provided. The mobile network operator (MNO) is a cellular radio network company that provides wireless service for mobile subscribers and is therefore sometimes referred to as a carrier service provider (CSP), a wireless service provider, a wireless carrier, or a mobile network carrier. For example, a carrier X may maintain subscriber identity data that is used in determining whether a given user of device 10 is authorized to use the services of carrier X. The subscriber identity data may sometimes be referred to as Subscriber Identity Module (SIM) data, SIM profile information, etc. Unauthorized users (i.e., users who do not have active accounts) will be denied service. Authorized users (i.e., valid subscribers) will be allowed to establish links to make and receive voice telephone calls, to download and upload data, or to otherwise obtain the services available from carrier X.

Subscribe identity data may be stored on a removable smart card sometimes referred to as a Universal Integrated Circuit Card (UICC). As shown in FIG. 3, data baseband processor 202 may be coupled to a first dedicated UICC 250-1, whereas voice baseband processor 204 may be coupled to a second dedicated UICC 250-2. A UICC 250 (i.e., UICC 250-1 or 250-2) may contain storage circuitry (e.g., non-volatile memory elements such as read-only memory (ROM) or electrically erasable programmable read-only memory (EEPROM), volatile memory elements such as static random access memory (SRAM) or dynamic random access memory (DRAM), and other types of storage components) and processing circuitry that serves as an interface between its storage circuitry and the baseband processor to which it is connected. UICC 250 may be used to store phonebook contacts, text messages, and other subscriber-related data. A UICC 250 can therefore be used to help users easily transfer their phonebook, preferences, and wireless service from one device to another.

As described above, UICC 250 may be used to store information that identifies a subscriber to the mobile network operator so the operator can determine whether or not to provide wireless service to that subscriber. In some contexts, UICC 250 may be referred to as a SIM card (when referring to GSM technologies) or a Removable User Identity Module (when referring to CDMA technologies).

A UICC 250 may also be used to run multiple subscriber identity module (SIM) applications. For example, UICC 250 may contain a Universal SIM (USIM) application that identifies device 10 to a mobile network operator using CS technologies such as UMTS or using PS technologies such as HSPA or LTE. As another example, UICC 250 may contain a CDMA SIM (CSIM) application that enables device 10 to access CDMA networks using CS technologies such as CDMA 1xRTT or using PS technologies such as EV-DO. As another example, UICC 250 may contain a SIM application that enables device to access GSM networks using CS technologies such as the 2G GSM or using PS technologies such as GPRS. If desired, a single UICC may contain more than one of these applications, thereby enabling mobile device 10 to have access to both UMTS and GSM radio networks (e.g., device 10 may be capable of supporting desired 4G, 3G, and/or 2G wireless communications protocols by configuring the UICC accordingly). If desired, UICC 250 may also be used to communicate with the mobile network operation using the Internet Protocol (IP).

Each mobile device 10 may be uniquely identified using an International Mobile Equipment Identity (IMEI) number, which is burned into device 10 during device manufacturing. Device 10 may be authorized to operate with only a particular carrier or carriers. This allows a carrier to subsidize the price of a device. In contrast, information specific to the subscriber (user) may be stored in UICC 250. For example, subscriber-related data that may be stored in UICC 250 may include International Mobile Subscriber Identity (IMSI), Temporary Mobile Subscriber Identity (TMSI), authentication key (Ki), service provider name, Local Area Identity (LAI), Registration Area Identity (RAI), and other network related information. The mobile network operator uses the IMSI of a user device to determine whether that device is a valid user for the particular network. The IMSI is rarely transmitted over the network to prevent eavesdropping. Instead, a randomly generated TMSI (i.e., a temporary identifier that is valid only for a given session) may be used as a proxy parameter and may be changed periodically for heightened security.

Authentication key Ki is a 128 bit value that is often paired with the IMSI when a UICC 250 is manufactured. Key Ki is used during device authentication operations to encrypt sensitive data. Key Ki should never be transmitted over the network and should not be transparent to the user of device 10 (i.e., Ki should not be extractable from a UICC). The LAI and RAI serve to identify the last known location of device 10. Mobile network operators are typically divided into location areas, each of which may be assigned a unique local area identifier. Each user devices operating within a particular region of a mobile network operator may have a common LAI (used for CS networks) or RAI (used for PS networks) stored in its UICC 250.

As shown in FIG. 3, device 10 may communicate directly with at least one base transceiver station (BTS). Base stations such as base stations 100 may be associated with a cellular radio network such as network 13 or other wireless networking equipment. Device 10 may communicate with base station 100 over wireless link 102 (e.g., a cellular telephone link, a data communications link, or other wireless communications link). Base station 100 may serve as the access point that bridges device 10 to the radio network. Base station 100 may contain antennas, radio-frequency front end circuitry (e.g., RF amplifiers, transceivers, combiners/splitters, duplexers, etc.), and/or baseband processing circuitry capable of handling speech encoding, data encryption, multiplexing (e.g., time division multiplexing or frequency division multiplexing), and modulation/demodulation of radio-frequency signals. The radio coverage area that is provided by base station 100 (or sometimes a group of collocated base stations 100) may be referred to as a "cell."

Multiple base stations 100 may be coupled to a common radio network controller (RNC) 104 via fiber optic links or wireless links. Radio network controller 104 serves to control the operation of its associated base stations 100 by allocating radio-frequency channels to each mobile device, analyzing power and signal measurements obtained from device 10 to determine which of base stations 100 is best suited to service a particular call, and performing handovers from one base station to another (assuming both base stations are controlled by that RNC 104). Radio network controller 104 is therefore sometimes referred to as a base station controller. Radio network controller 104 may be collocated with at least one of its associated base stations 100 or may be geographically separate from each of associated base stations 100.

Radio network controller 104 may be configured to route its wireless traffic based on the type of technology that is currently being used for wireless transmission. For example, if device 10 is attempting to set up a voice call, radio network controller 104 may allow device 10 to communicate with circuit switched domain registration network circuitry 130 (as indicated by path 136 in FIG. 3). As another example, if device 10 is attempting to establish an active data session, radio network controller 104 may allow device 10 communicate with packet switched domain registration network circuitry 132 (as indicated by path 134 in FIG. 3).

When a mobile device is turned on, it contacts a nearby base station 100 to register with the network. When making initial contact with the nearby base station, device 10 may use random access procedures to announce its presence to the network.

For example, during CS domain network registration procedures, communications between device 10 and the network may be primarily handled using a mobile switching center (MSC) 106. Mobile switching center 106 may be used to handle call setup, call routing, and other basic network switching functions. Mobile switching center 106 may control multiple radio network controllers 104 and may also interface wither other mobile switching centers. For example, mobile switching center 106 may be used to handle inter-RNC handoffs (e.g., handoff procedures between two radio network controllers that are coupled to one common mobile switching center 106) and to handle inter-MSC handoffs (e.g., handoff procedures with other mobile switching centers).

Whenever a mobile device requests access to the network, the network must authenticate that device. Mobile switching center 106 may first query a home location register (HLR) 120 and a visitor location register (often collocated with associated mobile switching center 106) to determine the current location of mobile device 10. Home location register 120 is a database that permanently stores data associated with each subscriber. For example, home location register 120 may maintain user-specific data such as the IMSI associated with each subscriber, the last known location of each subscriber, roaming restrictions (i.e., information showing whether a subscriber is allowed to have service in certain parts of the world), and other user data. The location data for device 10 may be updated during registration and may periodically be updated (whether or not the device changes its location).

In contrast, a visitor location register (VLR) may be a database that contains only a subset of the information that is stored on home location register 120. Each location area (typically comprised of a group of cells) may have an associated visitor location register, and that visitor location register may only store information associated with subscribers that are currently located in its location area. The visitor location register serves to reduce the number of queries to home location register 120, thereby reducing network traffic.

Once the location of device 10 has been determined, the visitor location register may be used to generate a temporary IMSI (or TMSI) corresponding to device 10 and may forward that TMSI to home location register 106 to request authentication. This new TMSI provided by the visitor location register may be generated based on an old TMSI that device 10 transmits to the network (e.g., an old TMSI obtained during a previous location update). The network may require device 10 to authenticate every time a network operation is requested (e.g., upon location update, mobile-originated call, etc.), whenever device 10 moves to a new location, after a predetermined period of time, etc.

When home location register 120 receives the TMSI, it checks its database to determine whether the received TMSI corresponds to a valid IMSI (i.e., a locally stored number that should be identical to the IMSI that is stored on UICC 250 in the mobile device). If the TMSI corresponds to a valid IMSI, an authentication request is forwarded to an authentication center (AuC) 118. Authentication center 118 is a database of subscribers that are allowed to register with a given network. Authentication procedures may involve verifying the identity and validity of the SIM profile stored on UICC 250 to ensure that the subscriber has been paying their bills and is authorized access to the network (e.g., authentication center 118 may be used to ensure that a subscriber has a valid account and may also be used for billing purposes).

Home location register 120 may also be coupled to an Equipment Identity Register (EIR) 122. Equipment identity register 122 is a database that tracks each manufactured device using the IMEI. Each network may have only one equipment identity register 122. Equipment identity register 122 may, for example, contain a black list, a gray list, and a white list. The black list contains a list of IMEIs that should be denied service by the network. Reasons for denied service may include a particular device being reported as stolen or duplicated or if the device is malfunctioning or does not operate properly on the network. The gray list contains a list of IMEIs that are to be monitored for suspicious activity (i.e., for devices that are considered to be behaving oddly or exhibiting unpredictable performance). The remainder of IMEIs may populate the white list and may be given service upon proper authentication operations. Home location register 120 may check with EIR 122 prior to querying authentication center 118.

Authentication center 118 may also be responsible for generating terms used for authentication and encryption on the network. Authentication center 118 may also store authentication key Ki corresponding to each IMSI on the network. In some scenarios, authentication center 118 is physically collocated with home location register 120.

For example, authentication center 118 will use the received IMSI to look up an associated private key Ki and to generate a random number RAND. Key Ki is only stored on authentication center 118 and UICC 250 of the current authenticating device. Authentication center 118 then uses RAND and Ki to generate a first signed response SRES1 using a first encryption algorithm and to generate a ciphering key Kc using a second encryption algorithm that is different than the first encryption algorithm. Crypto-variables RAND, SRES, and Kc are collectively referred to as a "triplet" (e.g., each triplet is unique to one IMSI). Authentication center 118 may generate multiple triplets and send them back to the requesting mobile switching center/visitor location register via home location register 120. Mobile switching center 106 may store the ciphering key Kc and the first SRES1 and forward the RAND to the registering mobile device.

In response to receiving RAND, device 10 uses key Ki that is stored on its UICC 250 to generate a second signed response SRES2 and ciphering key Kc using first and second encryption algorithms, respectively. Device 10 stores ciphering key Kc on UICC 250 and transmits second signed response SRES2 back to the network. When mobile switching center 106 receives SRES2, center 106 compares the SRES2 generated by device 10 to SRES1 generated by authentication center 118. If the first and second signed responses match, device 10 is authenticated and given access to the network. Once device 10 is authenticated, mobile switching network 106 passes ciphering key Kc to base stations 100. Ciphering key Kc associated with each authenticated device is stored at base stations 100 and will never be transmitted over the air. From this point on, wireless traffic may be conveyed between device 10 and nearby base stations 100, where the traffic that is being wirelessly transmitted is securely encrypted using ciphering key Kc (e.g., device 10 will operate in cipher mode).

Once authenticated, device 10 that is registered in the CS domain may communicate with other networks via a gateway MSC (G-MSC) 108. For example, if a mobile subscriber wants to place a call to a regular land line, the call would have to be routed through the Public Switched Telephone Network (PSTN) 110 via gateway mobile switching center 108. As another example, if a mobile subscriber using carrier X wants to call another subscriber using carrier Y, the call would have to be routed through gateway MSC 108 (i.e., a gateway MSC that connects the carrier X network to the carrier Y network).

In another suitable embodiment of the present invention, device 10 may be given Internet access by performing PS domain registration. During PS domain network registration/authentication procedures, communications between device 10 and network 13 may be primarily handled using a Serving GPRS Support Node (SGSN) 112 (as an example for a GSM-based packet switched network). As shown in FIG. 3, node 112 performs analogous functions as mobile switching center 106 by contacting home location register 120 and authentication center 118 in an effort to authenticate device 10 to establish an active data link. Upon authenticating device 10, device 10 may be given access to the Internet or other desired packet data network (PDN) 116 via radio network controller 104, support node 112, and a gateway GPRS support node 114 (i.e., a link between two different networks analogous to gateway MSC 108 in the CS domain).

The network diagram of FIG. 3 is merely illustrative and does not serve to limit the scope of the present invention. If desired, network 13 may include other networking equipment that is used for performing device registration/authentication, data/voice traffic routing, and other network switching operations.

Figure 4:
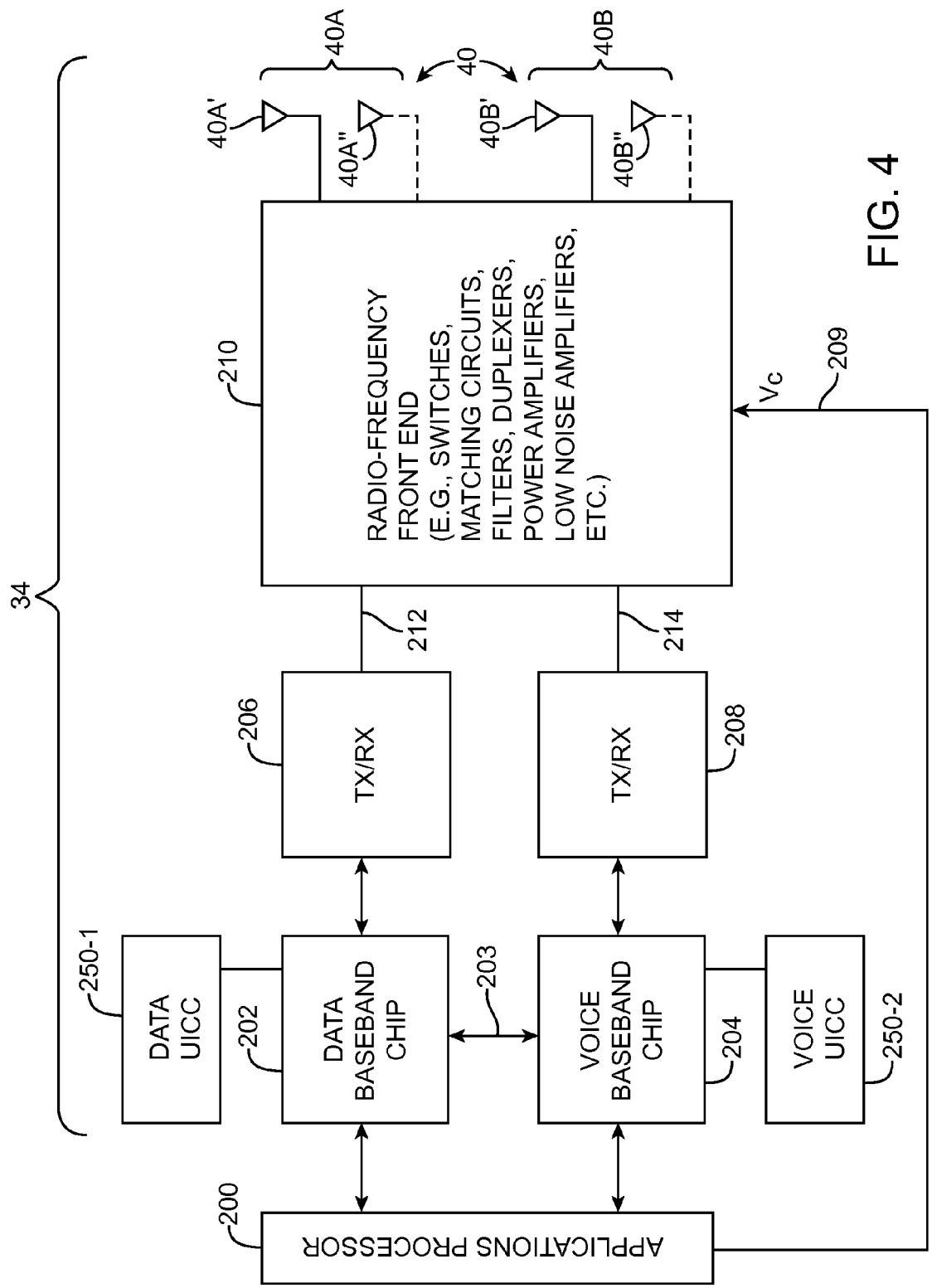
FIG. 4 is a diagram of illustrative wireless communications circuitry having a data baseband processing integrated circuit coupled to a first associated universal integrated circuit card (UICC) and having a voice baseband processing integrated circuit coupled to a second associated UICC, where the wireless communications circuitry is capable of receiving radio-frequency signals using four separate antennas in accordance with an embodiment of the present invention.

FIG. 4 is a diagram showing one suitable circuit arrangement for device 10 having more than one baseband processor integrated circuit. As shown in FIG. 4, baseband processors 202 and 204 may be coupled to a common control circuit such as applications processor 200. Applications processor 200 may be configured to store and execute control code for implementing control algorithms. Baseband processors 202 and 204 may be considered as part of wireless circuitry 34, whereas applications processor 200 may be considered as part of storage and processing circuitry 28. Baseband processors 202 and 204 may provide data traffic and voice traffic to applications processor 200 via respective paths.

Control signals may be conveyed between baseband processors 202 and 204 via a general purpose input-output (GPIO) path 203. Path 203 may be a universal asynchronous receiver/transmitter (UART) based connection, a universal serial bus (USB) based connection, a serial peripheral interface (SPI) based connection, or other suitable types of inter-processor communications connection. For example, information related to the current operating modes of the baseband processors (e.g., whether each of the baseband processors are in sleep mode or traffic mode) may be shared between processors 202 and 204 so that proper reception may be coordinated. If desired, SIM data may also be shared between processors 202 and 204 via path 203.

In addition to the transmitted user data, processors 202 and 204 may also provide applications processor 200 with information on whether responses (acknowledgements) are being received from a cellular telephone tower corresponding to requests from device 10, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by applications processor 200 and/or processors 202 and 204 and, in response, applications processor 200 (or processors 202/204) may issue control commands for controlling wireless circuitry 34.

As described previously in connection with FIG. 3, data baseband processor 202 may be coupled to an associated UICC 250-1, whereas voice baseband processor 204 may be coupled to an associated UICC 250-2. Having different UICCs may provide a user of device 10 with the flexibility in choosing voice and data plans from different service providers. For example, UICC 250-1 may include a first SIM profile for a data plan purchased from a first service provider while UICC 250-2 may include a second SIM profile for a voice plan purchased from a second service provider that is different from the first service provider. UICC 250-1 may be used during PS domain registration while UICC 250-2 may be used during CS domain registration (e.g., UICC 250-1 may contain a first IMSI that is only used during PS domain authentication operations whereas UICC 250-2 may contain a second IMSI that is different than the first IMSI and that is only used during CS domain authentication operations).

Wireless circuitry 34 may include radio-frequency transceiver circuitry such as radio-frequency transceiver circuitry (e.g., transceiver circuits 206 and 208) and radio-frequency front-end circuitry 210. Some transceivers may include both a transmitter and a receiver. If desired, one or more transceivers may be provided with receiver circuitry but no transmitter circuitry (e.g., to use in implementing receive diversity schemes).

Radio-frequency front end circuitry 210 may be coupled between the transceiver circuitry and antennas 40. In particular, transceivers 206 and 208 may be coupled to front end circuitry 210 via paths 212 and 214, respectively. Radio-frequency front end 210 may be used to convey the radio-frequency signals that are produced by the radio-frequency transceiver circuitry to antennas 40. Radio-frequency front end 210 may include radio-frequency switches, impedance matching circuits, band pass filters, duplexers, power amplifiers, low noise amplifiers, and other circuitry interposed between antennas 40 and transceivers 206 and 208.

Incoming radio-frequency signals that are received by antennas 40 may be provided to baseband processors 202 and 204 via radio-frequency front end 210, paths such as paths 212 and 214, and receiver circuitry in transceivers 206 and 208. Path 212 may, for example, be used in handling signals associated with transceiver 206, whereas path 214 may be used in handling signals associated with transceiver 208. Baseband processors 202 and 204 may be used to convert received signals into digital data that is provided to applications processor 200. Baseband processors 202 and 204 may also extract information from received signals that is indicative of signal quality for the channel to which the associated transceivers are currently tuned.

In the example of FIG. 4, antennas 40 may include a first pair of antennas 40A and a second pair of antennas 40B. The first antenna pair may include antenna 40A' that can be used to transmit and receive wireless signals and may include antenna 40A" that can only be used to receive wireless signals. Similarly, the second antenna pair may include antenna 40B' that can be used to transmit and receive wireless signals and may include antenna 40B" that can only be used to receive wireless signals. Antennas 40A' and 40B' may sometimes be referred to as "primary" antennas (i.e., antennas capable of transmitting and receiving RF signals), whereas antennas 40A" and 40B" may sometimes be referred to as "secondary" antennas (i.e., antennas capable of only receiving RF signals). As an example, antennas 40A may be formed in region 22 of device 10, whereas antennas 40B may be formed in region 24 of device 10. If desired, antennas 40 may include less than four antennas or more than four antennas (e.g., device 10 may include any number of primary antennas and any number of secondary antennas).

Radio-frequency front end 210 may include switching circuitry. The switching circuitry may be controlled using control signals Vc received from applications processor 200 via path 209. If desired, the state of radio-frequency front end 210 may also be controlled using control signals generated from at least one of baseband processors 202 and 204.

As an example, the switching circuitry in front end 210 may be capable of coupling transceiver 206 to antenna 40A (e.g., so that transceiver 206 can transmit RF signals using antenna 40A' and receive RF signals using at least one of antennas 40A' and 40A") while coupling transceiver 208 to antenna 40B (e.g., so that transceiver 208 can transmit RF signals using antenna 40B' and receive RF signals using at least one of antennas 40B' and 40B"). As another example, the switching circuitry may be capable of switching a first portion of antennas 40 into use (referred to as currently active antennas) while switching a second portion of antennas 40 out of use (referred to as inactive antennas). In this scenario, the currently active antennas may be coupled to either transceiver 206 for handling data traffic or transceiver 208 for handling voice traffic. As another example, the switching circuitry may be capable of coupling both antenna pairs 40A and 40B to a selected one of transceivers 206 and 208 (e.g., the selected transceiver may be coupled to any two of antennas 40 for receiving RF signals via those two antennas). As another example, the switching circuitry may be capable of coupling both transceivers 206 and 208 to one active antenna (e.g., to antenna 40A' or 40B') so that transmit signals may be radiated using a common antenna.

If desired, antenna selection may be made by selectively activating and deactivating transceivers without using a switch in front end 210. For example, if it is desired to use antennas 40A but not antennas 40B, transceiver 208 (which may be coupled to antennas 40A through circuitry 110) may be activated and transceiver 206 (which may be coupled to antennas 40B through circuitry 110) may be deactivated. If it is desired to use antennas 40B but not antennas 40A, applications processor 200 may activate transceiver 206 and deactivate transceiver 208. Combinations of these approaches may also be used to select which antennas are being used to transmit and/or receive signals. When it is desired to receive incoming signals such as paging signals using both antennas, transceiver 206 and transceiver 208 may be simultaneously activated to place device 10 in a dual antenna mode. The radio configuration of FIG. 4 is merely illustrative and is not intended to limit the scope of the present invention. If desired wireless circuitry 34 may include any number of baseband processing integrated circuits and associated transceivers, any number of antennas, and any suitable circuitry for interfacing the antennas and the transceivers.

Figure 5:
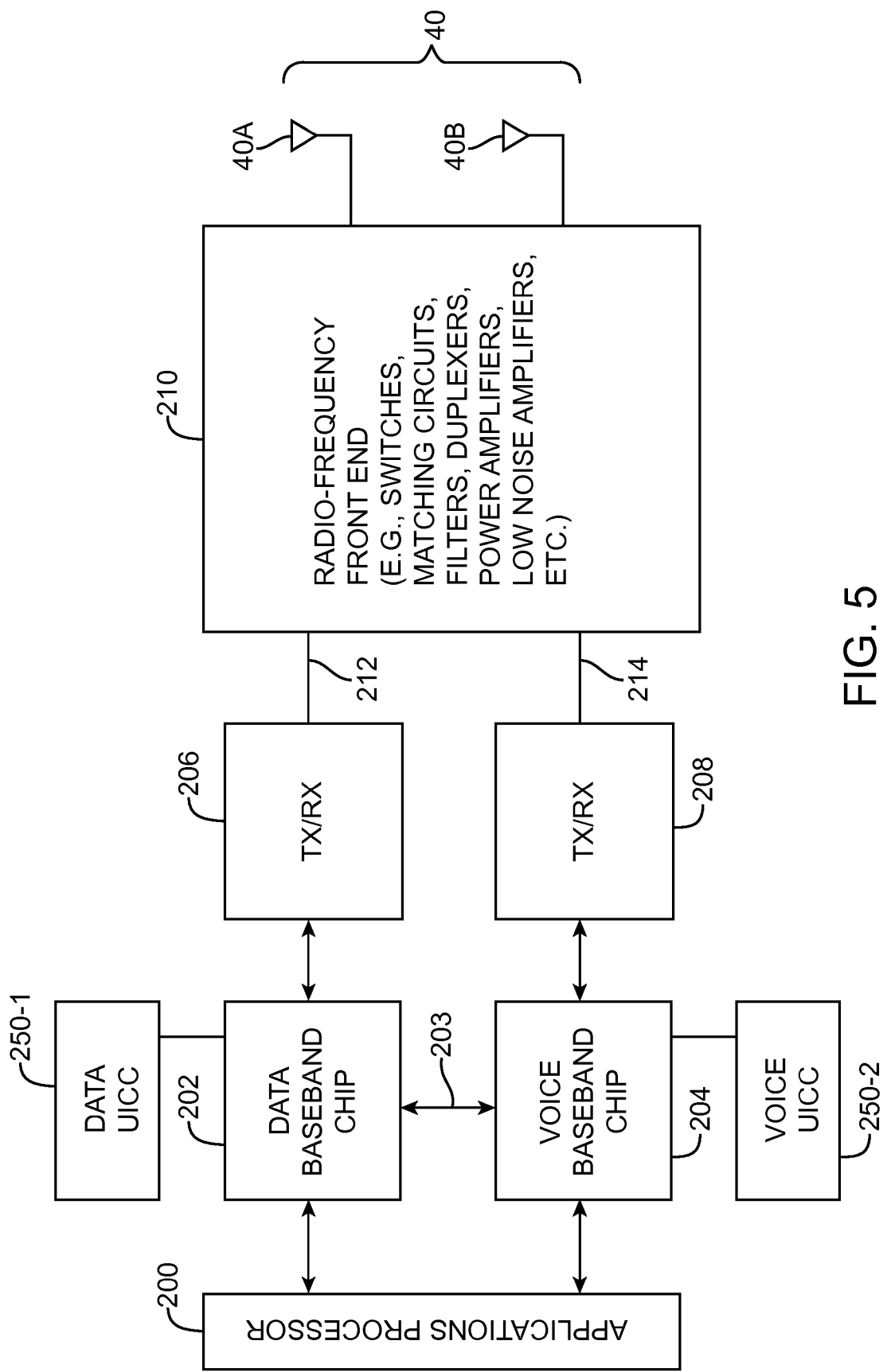
FIG. 5 is a diagram of the wireless communications circuitry of the type shown in FIG. 4 that is capable of receiving radio-frequency signals using two separate antennas in accordance with an embodiment of the present invention.

FIG. 5 shows another suitable arrangement for wireless circuitry 34. As shown in FIG. 5, antennas 40 may include antennas 40A and 40B. Antennas 40A and 40B may each be used to transmit and receive radio-frequency signals (e.g., device 10 need not include secondary antennas). As an example, front end 210 may be configured to couple transceiver 206 to antenna 40A and to couple transceiver 208 to antenna 40B (e.g., so that data traffic is handled using antenna 40A and so that voice traffic is handled using antenna 40B). As another example, front end 210 may be configured to couple transceiver 206 to antenna 40B and to coupled transceiver 208 to antenna 40A (e.g., so that data traffic is handled using antenna 40B and so that voice traffic is handled using antenna 40A). As another example, front end 210 may be configured to couple transceivers 206 and 208 to a selected one of antennas 40A and 40B so that data traffic and voice traffic can be transmitted/received via a shared antenna (e.g., transceivers 206 and 208 may take turns transmitting and receiving wireless signals in a time division duplexing scheme). As another example, front end 210 may be configured to couple antennas 40A and 40B to only transceiver 208 so that voice traffic may be transmitted/received using both antennas 40A and 40B (to support multiple-input multiple-output (MIMO) wireless communications schemes).

Figure 6:
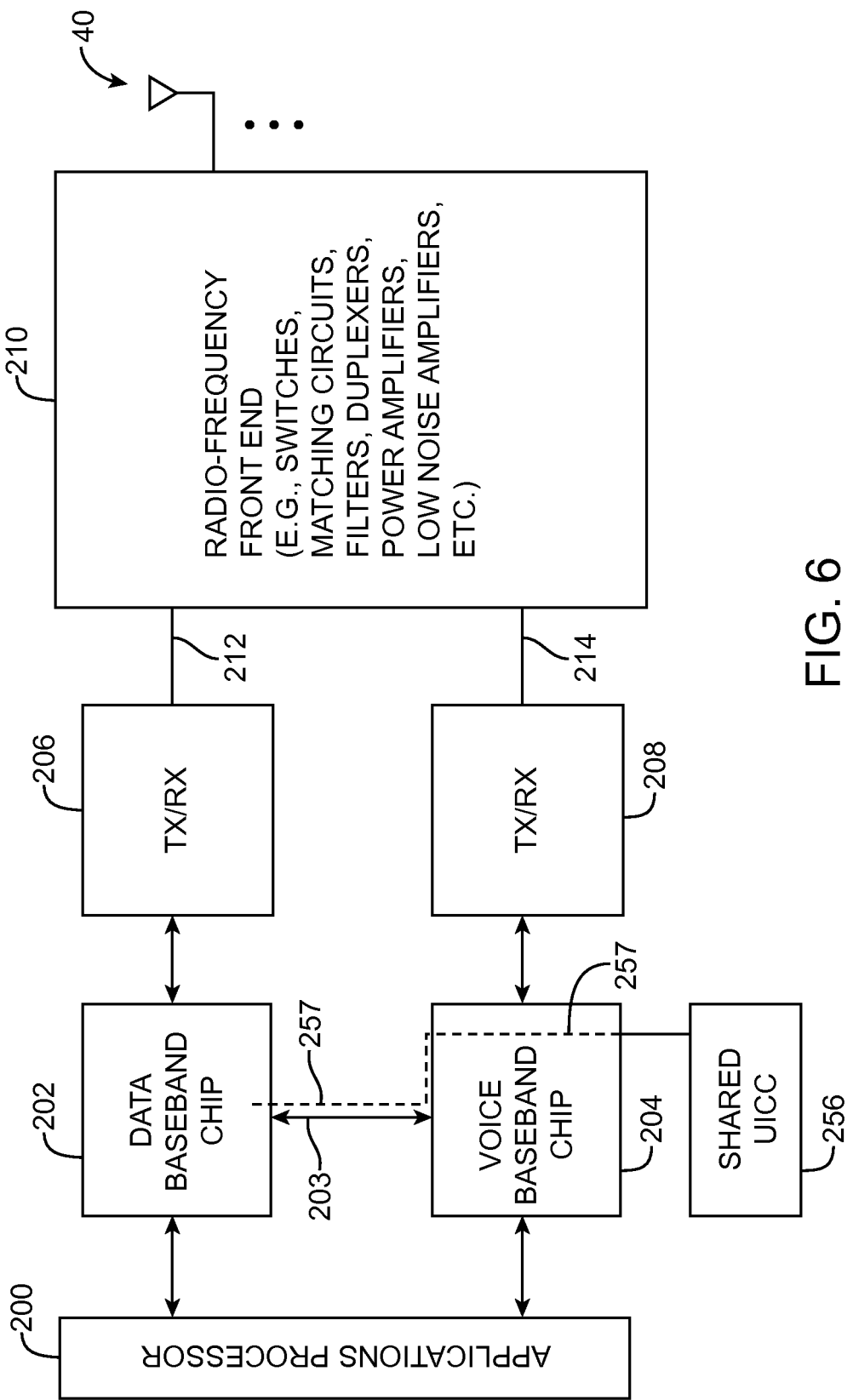
FIG. 6 is a diagram of illustrative wireless communications circuitry having only one UICC that is directly coupled to the voice baseband processor integrated circuit in accordance with an embodiment of the present invention.
Figure 7:
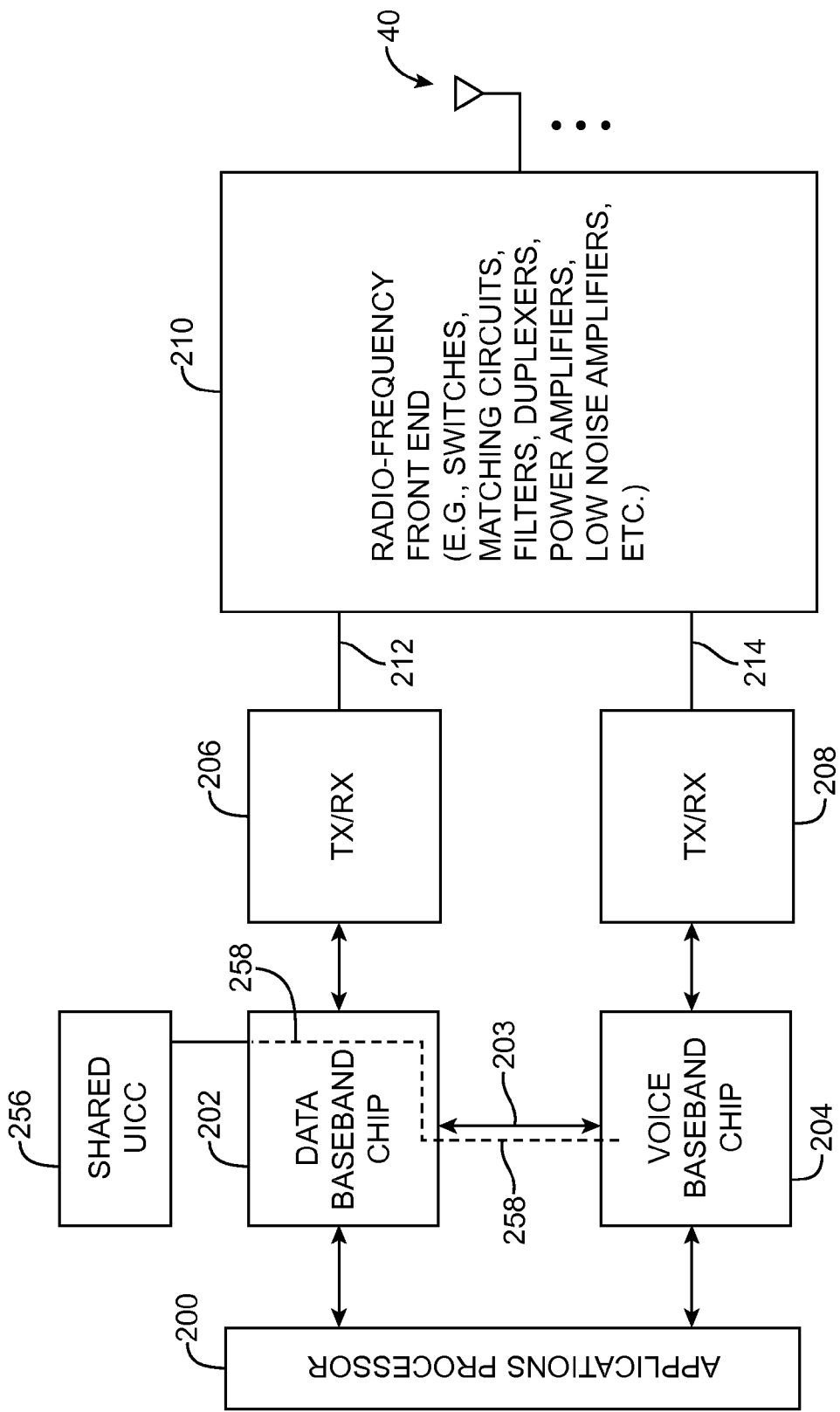
FIG. 7 is a diagram of illustrative wireless communications circuitry having only one universal integrated circuit card that is directly coupled to the data baseband processor integrated circuit in accordance with an embodiment of the present invention.

In another suitable arrangement of the present invention, device 10 may only contain one UICC (see, e.g., FIG. 6). As shown in FIG. 6, UICC 256 may be directly coupled to voice baseband processor 204. UICC 256 may store a single IMSI that is used for both PS and CS domain registrations (e.g., UICC 256 may be shared between baseband processors 202 and 204). During CS domain registration operations, voice baseband processor 204 may retrieve the IMSI and private key Ki from UICC 256. During PS domain registration operations, data baseband processor 202 may retrieve the IMSI and private key Ki from UICC 256 via voice baseband processor 204 and inter-processor path 203, as indicated by path 257. If desired, shared UICC 256 may instead be coupled directly to data baseband processor 202 (see, e.g., FIG. 7). In general, UICC 256 may be directly coupled to the baseband processing integrated circuit having more stringent performance requirements.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for wirelessly transmitting and receiving packet switched traffic and circuit switched traffic in an electronic device that has first and second baseband processor integrated circuits, comprising:

transmitting and receiving the packet switched traffic using the first baseband processor integrated circuit;

transmitting and receiving the circuit switched traffic using the second baseband processor integrated circuit, wherein the first baseband processor integrated circuit is coupled to the second baseband processor integrated circuit via an inter-processor communications path;

with a universal integrated circuit card connected to the first baseband processor integrated circuit, providing subscriber identity module (SIM) profile data to the first baseband processor integrated circuit; and conveying control signals that include the SIM profile data from the first baseband processor integrated circuit to the second baseband processor integrated circuit via the inter-processor communications path to enable the second baseband processor integrated circuit to register with a wireless network.

2. The method defined in claim 1, further comprising:

performing packet switched network registration using the SIM profile data; and performing circuit switched network registration using the SIM profile data.

3. The method defined in claim 1, wherein the wireless network is associated with a service provider.

4. A method for wirelessly transmitting and receiving packet switched traffic and circuit switched traffic in an electronic device that has first and second baseband processor integrated circuits, comprising:

transmitting and receiving the packet switched traffic using the first baseband processor integrated circuit;

transmitting and receiving the circuit switched traffic using the second baseband processor integrated circuit, wherein the first baseband processor integrated circuit is coupled to the second baseband processor integrated circuit via an inter-processor communications path;

with a universal integrated circuit card connected to the second baseband processor integrated circuit, providing subscriber identity module (SIM) profile data to the second baseband processor integrated circuit; and conveying control signals that include the SIM profile data from the second baseband processor integrated circuit to the first baseband processor integrated circuit via the inter-processor communications path to enable the first baseband processor integrated circuit to register with a wireless network.

5. The method defined in claim 4, further comprising:

performing packet switched network registration using the SIM profile data; and performing circuit switched network registration using the SIM profile data.

6. The method defined in claim 4, wherein the wireless network is associated with a service provider.

* * * * *